United States Patent [19]

Sereda

[11] Patent Number: 4,598,241
[45] Date of Patent: Jul. 1, 1986

[54] RECTIFIER COMMUTATION IN ELECTRICAL MACHINES

[76] Inventor: Mykola Sereda, C.P. 358, Succ. K, Montréal, Québec, Canada, H1N 3L3

[21] Appl. No.: 397,028

[22] Filed: Jul. 12, 1982

[51] Int. Cl.$^4$ ............................................. H02K 13/00
[52] U.S. Cl. ..................................... 318/439; 318/138; 318/345 C; 318/345 CA; 318/345 D; 310/266; 310/220
[58] Field of Search ............ 318/439, 345 C, 345 CA, 318/345 CB, 345 AB, 345 B, 345 D, 345 F, 345 G, 345 H, 254, 138, 491, 541, 361; 310/68 D, 68 R, 220, 221, 222, 223, 224, 225, 230, 231, 266, 232, 233; 361/2, 13; 322/99, 100

[56] References Cited

U.S. PATENT DOCUMENTS

| | | | |
|---|---|---|---|
| 3,023,348 | 2/1962 | Cox | 318/138 |
| 3,205,428 | 9/1965 | Kerr et al. | 318/439 X |
| 3,453,513 | 7/1969 | Bates | 310/220 X |
| 4,024,455 | 5/1977 | Yarrow et al. | 318/439 X |
| 4,388,547 | 6/1983 | Gruber | 310/266 |
| 4,425,536 | 1/1984 | Larson | 310/222 X |

OTHER PUBLICATIONS

Using Thyristors and Diodes to Improve Commutation, by J. J. Bates, I.E.E.E. Spectrum, 1/71.

Primary Examiner—William M. Shoop, Jr.
Assistant Examiner—Shik Luen Paul Ip

[57] ABSTRACT

In electrical machines with commutators, installing diodes and controlled rectifiers right into the electromechanical structure of armatures
eliminates sparking of the commutators, and also
allows the design of AC-fed motors having the characteristics of DC motors, including the capability to return power to the AC line while being overdriven.

Use of controlled rectifiers permits to eliminate the mechanical commutator itself; the controlled rectifiers assume the commutation process utilized by the invention, wherein there is a cooperation between rectifiers and armature coils undergoing commutation.

17 Claims, 9 Drawing Figures

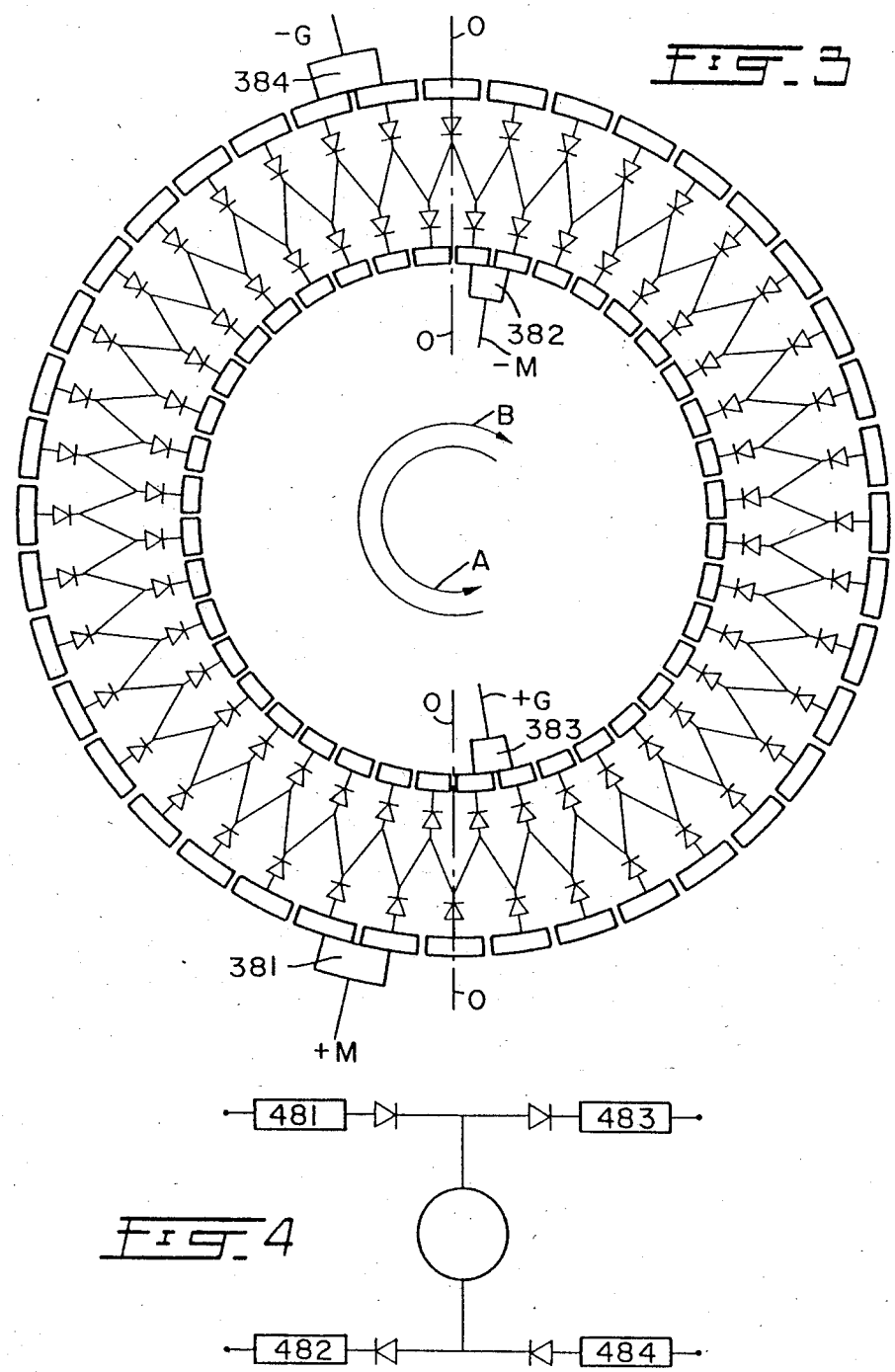

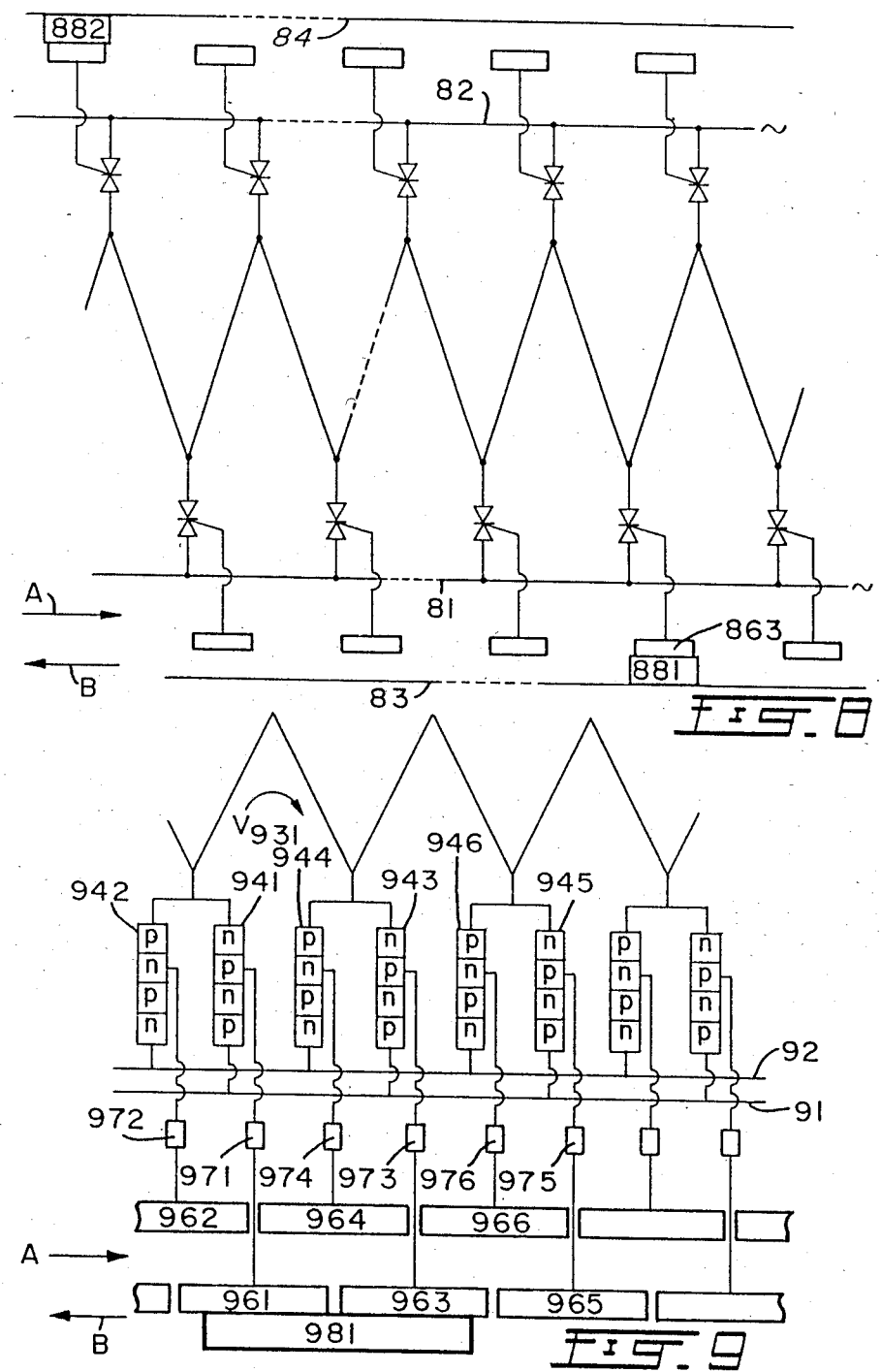

RECTIFIER COMMUTATION IN ELECTRICAL MACHINES

BACKGROUND OF THE INVENTION

The invention pertains to the commutation process employed in electrical machines, such as DC machines (motors and generators), AC commutator machines (series motors, repulsion motors, commutator-type induction motors of the Schräge design and others), DC to AC and DC to DC converters, etc. A commutator with its brushes serves the function of substituting the electrical coils of an armature during the relative motion (rotation) of the armature and a field, by establishing and disestablishing contact, through commutator segments and brushes, between successive coils and an external circuit, which is either a source of electrical energy (in case of a motor) or a receptor of same (in case of a generator).

The present invention addresses itself to a practical problem well known in the art, namely the commutator sparking. The sparking being a persistent problem, it gives a characteristic disadvantage to any commutator machine. The invention presents a new and different means to improve the commutation properties of practical machines, thus competing with, or complementing the means known in the art (e.g., interpoles with commutating windings).

In order to understand the operation of the invention, there is no need to be concerned with all of the aspects of design and construction of electrical machines; therefore, unless specifically indicated to the contrary, such details as the number of poles, the particular type of winding employed (be it gramme, lap, wave, or yet another type useful in a commutator machine) will not be considered, following a long established practice in the art.

SUMMARY

To accomplish its objects, the present invention employs rectifier devices, such as semiconductor diodes, thyristors (also known as silicon controlled rectifiers, or SCR's) and triacs, to participate in, help in, and actually accomplish the current transfer process of the commutation.

The rectifier devices are installed into, or are forming an integral part of the construction of armatures. They intimately cooperate with the electro-motive force of relative motion (called "counter-e.m.f." in electric motors); this e.m.f. extinguishes, with its induced current, the rectifier devices as they perform commutation, i.e. current transfer in the armature coils short-circuited during the specific instances of the commutation process.

Utilizing the present invention, an electric motor can be designed that will have all the characteristics of a DC motor while being fed directly from AC power line. In addition to the solution of the sparking problem, the present invention allows the designer to implement an AC-fed DC motor having the capability to return power to the AC line while being overdriven by its load, a capability not easily available when the AC power is rectified for supplying DC motors, in the prior art.

Controlled rectifiers, when installed in electrical machines utilizing the invention, are able to change the very nature of commutators, making the electrical separation of segments unnecessary. Thus, instead of commutators, the machines may be designed with slip rings as current collecting elements, or the designer may reverse the rotatability of field and armature so as to replace the commutator by stationary electrical contacts, if he is willing to face the problem of rotating field (which may be resolved more easily than that of the power take off, sometimes, with permanent magnets, or rotating transformer-rectifier circuits).

Figure 1:
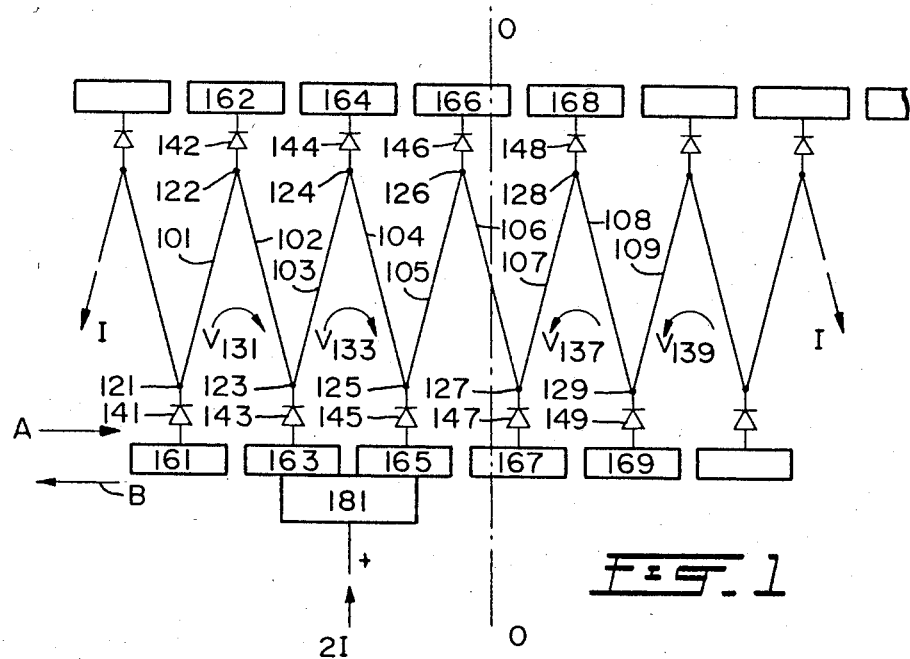
FIG. 1: Electrical diagram, with diode-equipped commutators at opposite ends of armature.
Figure 2:
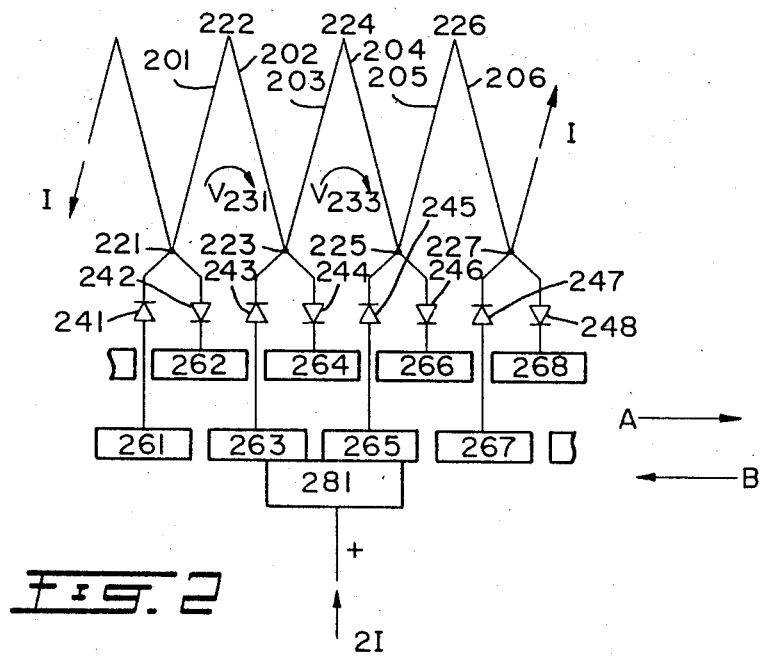
FIG. 2: Electrical diagram, with diode-equipped commutators at the same armature end.

All the elements referred to in FIG. 1 by numbers series 101,102, ... etc., have their exact equivalents in FIG. 2 referred to by numbers series 201,202, ... etc. The first digit names the figure number, second and third digits designate a particular element.

This principle is followed also in all remaining drawings, although its application is somewhat less rigorous in FIG. 8 and FIG. 9.

FIG. 3: Development of armature, with positions of brushes.

FIG. 4: Simplified schematic representation of FIG. 3.

Figure 5:
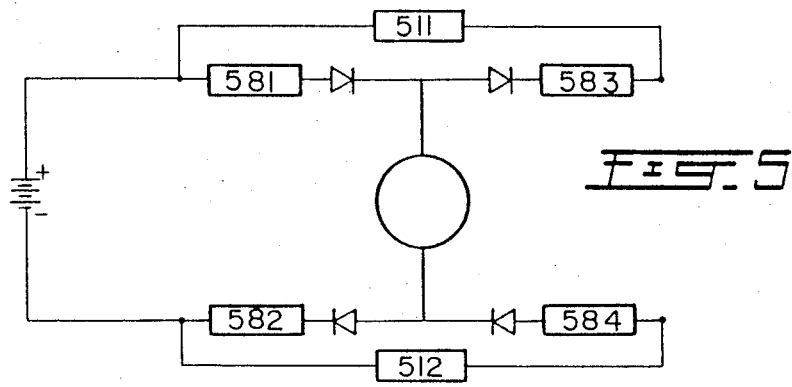

FIG. 5: External connections diagram, DC motor employing sparkless commutation of the invention and conserving characteristics of generation while overdriven.

Figure 6:
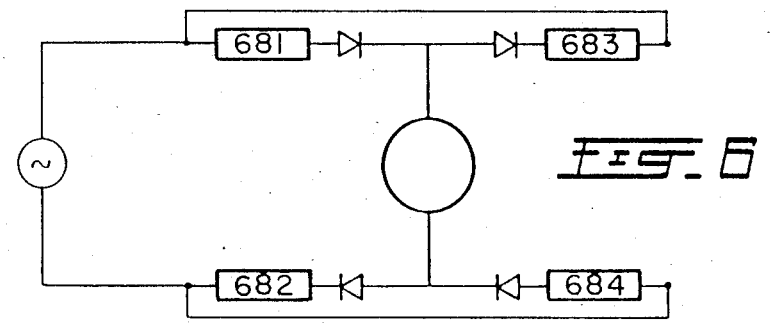

FIG. 6: External connections diagram, universal motor with interpoles, employing sparkless commutation of the invention and conserving characteristics of generation while overdriven.

Figure 7:
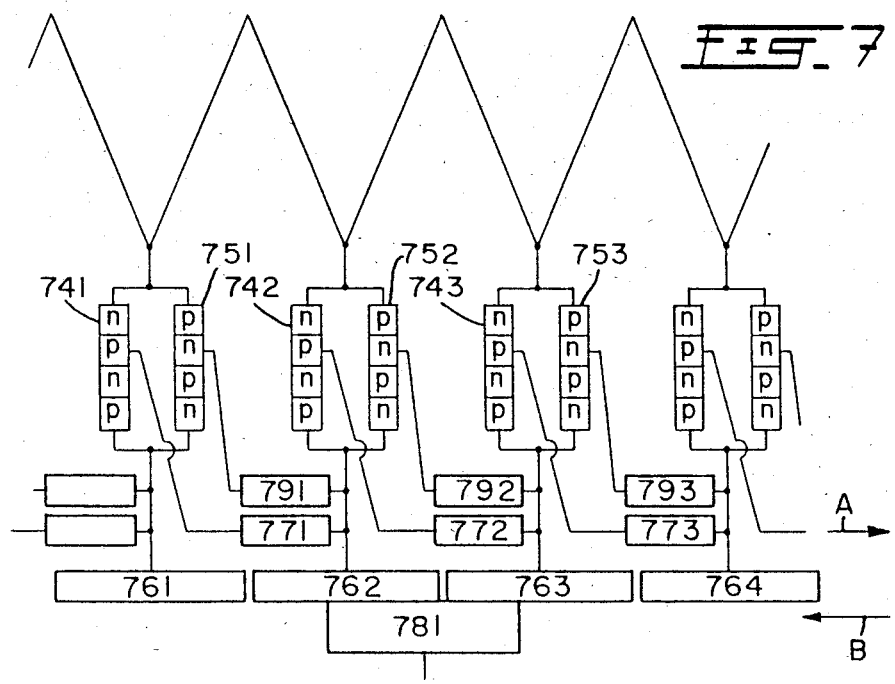

FIG. 7: Electrical diagram, with commutator, controlled rectifiers, and triggering connections.

FIG. 8: Electrical diagram, universal motor with controlled rectifier commutation, and auxiliary commutators.

FIG. 9: Electrical diagram, DC motor with controlled rectifier commutation, and auxiliary commutators.

In FIG. 8 and FIG. 9, the auxiliary commutators utilize reference numbers series, as to their last two digits, earlier used to designate the elements of power commutators.

DESCRIPTION

FIG. 1 represents the electrical connections schematics of an embodiment of the invention; a portion of commutator is shown, located in the vicinity of a brush.

Elements 101,102,103,104, ... etc. are coil sides, each pair of coil sides (101 and 102, 103 and 104, 105 and 106, ... etc.) forming a coil. Coil sides are joined at nodes 121, 123, 125, ... etc., as well as 122, 124, 126, ... etc.; in continuously wound armatures, these nodes may be nothing more than convenient points of access. The nodes 121, 123, ... etc. are connected through links containing diodes 141, 143, 145, 147, ... etc., to a commutator whose segments are 161, 163, 165, 167, ... etc., with all the diodes being arranged in the same sense of polarity. The set of electrically isolated commutator segments 161,163, ... etc. forms a complete commutator assembly, like those known in the art. However, for comparison, in the prior art the nodes 121, 123, ... etc. would be connected directly, or possibly by resistance leads, to commutator segments 161, 163,165, ... etc.

To provide a complete electric circuit, another set of diodes 142,144,146, . . . etc. connects nodes 122,124, 126, . . . etc. with a second commutator whose segments are 162,164,166, . . . etc. The sense of polarity of diodes 142,144, . . . etc. is complementary to the set 141,143, . . . etc., so as to allow the passage of current through the armature.

Brush 181 is one of those providing requisite electrical connections.

Line O—O indicates a magnetic neutral resulting from the interaction of the magnetic field of the machine and its armature reaction.

A brush for the opposite polarity, not shown, will be located at another magnetic neutral, not shown, and will be cooperating with the second commutator formed by segments 162,164,166, . . . etc.

While in the prior art, brushes of both polarities were operating on the same commutator, the present embodiment of the invention separates the polarities and thus uses a set of two commutators, each with its own brush, or brushes. Whenever the prior art required a number of brush pairs, their total number remaining the same, the brushes will be divided between two commutators, according to their polarity.

Nodes 122,124,126, . . . etc., referred to earlier, are some points in the coils 101-102, 103-104, . . . etc., that can be chosen arbitrarily, although it is preferable that they all be located analogously with respect to each other. For instance, they may be the midpoints of the coils 101-102,103-104, . . . etc.

The functioning of the invention does not change if the same nodes are chosen for the connection to both commutators, as shown on FIG. 2.

The description given to FIG. 1 can be transposed exactly as it is to FIG. 2, if care is taken to replace each reference number beginning with digit 1 with a corresponding reference number beginning with digit 2. For example, earlier reference to brush 181 becomes a reference to brush 281.

A design in accordance with FIG. 2 assures locating both sets of brushes and commutators on the same end of the machine axis of rotation.

Referring again to FIG. 1, in order to make our explanation of the invention more specific, we will now designate polarities and directions of relative motion. Let 2I be the current entering into the machine through brush 181. The current is splitting in two paths of value I; the reversal of the current I must occur as the result of the commutation.

Let the machine be a DC motor. Arrow A shows the direction of the relative motion of armature (which on FIG. 1 includes all tangible elements shown except the brush 181); arrow B shows the relative motion of the brush 181.

Arrows . . . , $V_{131}$, $V_{133}$, and $V_{137}$, $V_{139}$, . . . indicate the counter electro-motive forces generated in respective coils of the machine, and their directions.

Current transfer action of the present embodiment of the invention occurs in the following manner. Referring to FIG. 1, wherein we are considering a motor circuit, the position of brush 181 is retarded in reference to the direction of motion A of the armature and magnetic neutral O—O. When coil 103-104 is being short-circuited by brush 181, commutator segment 163 has just come into contact with the brush 181, and commutator segment 165 is the one that is first going to lose contact with the brush 181. During a brief period of time, both diodes 143 and 145 are conducting. The counter-e.m.f. $V_{133}$ will be short-circuited in the coil 103-104, and it will be opposed only by resistance and by the electromotive forces of self-induction, resulting from the rate of change of flow of the current which is being diminished from it full value I and is subsequently being reversed to reach its full value I in the opposite direction. After the current through diode 145 has been reduced to zero, the counter-e.m.f. closes the diode 145, i.e. the current flow through the commutator segment 165 stops completely, for all practical purposes (secondary-order effects related to semiconductor physics, capacitances, etc. can be taken care of by an electronics designer). Therefore, when the brush 181 and the segment 165 separate, no current need be interrupted, and the cause of sparking is eliminated.

Commutating action will not differ from the one just described if the brush is wider than two commutator segments, as long as the overall brush position is retarded (a motor being considered). The requirement of retardation is suggestive of the well known practice in the art. In the present invention, the current will tend to transfer itself to the most retarded segment of the commutator (i.e., the latest one coming in contact with the brush), shutting off the others. This action of mutual extinguishing of rectifiers is suggestive of that which occurs in conventional multiphase rectifier circuits.

For generator action, the present embodiment of the invention can be applied just as described above, provided that the generator's rule of the placement of the brushes be obeyed (the brushes must be advanced). However, since in a generator, the current and e.m.f. across our diodes have the same direction, the commutator segments need not be separated, because the rectifiers will perform the function of their electrical separation themselves, by the action of mutual extinguishing referred to in previous paragraph.

Which means that in a machine to be used as generator only, a slip ring may be employed instead of a commutator; or, if the field is made to rotate, a stationary armature provides stationary electrical terminals for power current collection. A machine designed in accordance with this last principle resembles a multi-phase alternator supplying a full-wave (multiphase bridge) rectifier circuit; however, there is a fundamental point of difference in that the present invention relies on the spacial movement (rotation) of the field, while a multi-phase circuit is calculated in terms of time-phase shifts; in addition, there are also important differences in construction of the armature windings between DC and AC machines. Admittedly, the conceptual development of the present invention in this direction would lead it to the limits of existing art, which may be compared to arriving to the outer limits of a familiar territory from outside, instead of following the known access routes.

Returning to the embodiment of the invention illustrated in FIG. 1 and FIG. 2, we will now notice that it can not be used interchangeably for motoring and generating, unless the position of brushes be changed with the change of function, retarding or advancing them (the machines with interpoles, which do not require this brush shift, will be considered below). Also, the sense of polarity of terminals of machines designed in accordance with FIG. 1 and FIG. 2 reverses following their application either as motors, or generators.

However, what is of real interest is not the use of the invention for the design of generators, but rather an incorporation of generating action into the motors designed in accordance with the present invention.

FIG. 3 is used to illustrate the implementation of this objective. FIG. 3 represents a plane development of armature of a motor designed in accordance with FIG. 1. With the direction of armature rotation shown by arrow A, brush rotation by arrow B (if the brushes were to rotate), and with magnetic neutrals designated by O—O, brush 381 corresponds to the brush 181, described earlier; it is the brush used for the connection to the external positive terminal; we will call it "positive motoring", or simply "+M" brush; it is retarded. Brush 382 was referred to, although not shown, in the explanation pertaining to the functioning of the invention as per FIG. 1; it is negative motoring brush, or "−M". Similarly, brush 383 is "+G", positive generating, and brush 384 is "−G", negative generating.

It is to be noted, that if brush 383 were connected to the negative terminal of external power source, and brush 384 were connected to the positive terminal of this power source, and with the field keeping its polarity (direction) unchanged, the machine of FIG. 3 remains fully functional, but the direction of rotation would reverse, brush 384 would, of course, become "+motoring", brush 383 would be "−motoring", while 382 would become "+generating" brush and 381 would become "−generating" brush.

FIG. 4 is a simplified schematic representation of FIG. 3; it illustrates the notion that a machine designed according to the present embodiment of the invention can be seen as an element to be used in an endless variety of circuits. There are many possible ways to connect this machine to external circuits, in accordance with skill and desires of a designer. Elements 481,482,483 and 484 represent brushes 381, 382,383 and 384 of FIG. 3.

FIG. 5 shows a preferred way to connect the machine described in FIG. 4 and FIG. 3. Again, elements 581,582, 583 and 584 represent brushes 381,382,383 and 384 of FIG. 3. DC power source is connected directly to brushes 581 (i.e., 381) and 582 (i.e., 382). Added elements 511 and 512 may be resistors, to limit a circulating current resulting from any unbalance in the coil set embraced by neighboring brushes, such as 381-383. Theoretically, the counter-e.m.f. between 381 and O—O axis ought to balance the counter-e.m.f. between O—O axis and 383, so that brushes 381 and 383 can be connected to the same point. Elements 511 and 512 may, or may not, be needed.

Assuming that 511 and 512 can be neglected, DC motor of FIG. 5 is a complete equivalent of a DC motor as known in the state of the art, minus sparking. If it is overdriven by its load, it will pump energy back into power source. If the power source reverses its polarity, the direction of rotation changes, and the capability of returning energy when overdriven remains intact. The functioning of brushes which makes this possible was described earlier in reference to FIG. 3.

Machines with interpoles will now be considered. State of art teaches how to use the interpoles that improve commutation. There is no conflict between the use of interpoles and the present invention; in fact, by merely leaving the brushes as they are under the interpoles, the cooperation is assured. In machine with interpoles, there is no need to change the position of brushes with a reversal of direction of rotation. The motoring and generating brushes can be located at the same armature point. Referring to FIG. 2, when the brush 281 "looks into" coil 203-204 via segments 263 and 265, a brush 283 (not shown on FIG. 2, but equivalent to 383 of Fig. 3) would be "looking into" the same coil 203-204 via segments 264 and 266. At the instant of time illustrated in FIG. 2, coil 203-204 is passing through the geometric neutral of the main magnetic field, but the presence of auxiliary commutation assistance field, known also as the interpole field, assures the presence and necessary cooperation of a needed e.m.f. designated as $V_{233}$. It will reverse its polarity as needed for motoring and generating.

Following the reasoning steps that led earlier, starting from FIG. 1 and FIG. 2 and passing through FIG. 3, to represent the machine using the first described embodiment of the invention by FIG. 4, now the same FIG. 4 can be used to represent a machine with interpoles, and brushes located as described in previous paragraph, i.e. on the geometric axes.

FIG. 6 shows a preferred way to connect the machine just described by FIG. 4, to which we impute the features recited immediately above. Element 681 is representing brush 281 as seen on FIG. 2, element 683 represents brush 283 (not shown but described above) located in the vicinity; elements 682 and 684 represent brushes located at the opposite points of armature. The motor of FIG. 6 has all the features of a universal motor as known in the state of the art, minus sparking. It can be used as DC motor, as described for FIG. 5. Moreover, the usual expedient of assuring an in-phase reversal of its field makes it an AC-fed DC motor, having the characteristics of being able to regenerate, i.e. pump the power back into AC line while overdriven by its load.

This feature seems to be particularly interesting in comparison with the prior art practice of rectified AC power for DC motors, where the regeneration is not available if the rectification is accomplished with diodes, and is fairly complicated if accomplished with controlled rectifiers.

The motor of FIG. 6 is reversible by the reversal of either power phase or field phae in AC, power polarity or field polarity in DC applications.

In another embodiment of the invention, controlled rectifiers, such as thyristors, also known as SCR's, as well as triacs, are employed instead of diodes. This allows a great variety of advantageous improvements.

In a motor equipped with controlled rectifiers, a single commutator is sufficient, just as it is in prior art DC motors, instead of at least a pair of commutators needed when diodes only are used. This can be accomplished easily, by triggering only those controlled rectifiers, of an appropriate polarity, that are needed to cooperate with a particular brush; the counter-e.m.f. takes care of their extinguishing.

A variety of means may be employed to trigger ("fire") the controlled rectifiers at a desired moment of rotation. It seems reasonable to chose this moment as the instant when brush comes in contact with a new segment, then the controlled rectifier cooperating with this particular segment ought to fire.

FIG. 7 shows, by way of example, a preferred embodiment of a DC motor employing a means of triggering which utilizes the motor's commutator itself. Here arrows A and B designate the direction of relative rotation of armature and brush. The power current flows through brush 781 and is being commutated by a pair of controlled rectifiers, say, 742 and 743, for 781 being of positive polarity. If brush 781 is of negative polarity, the cooperation of controlled rectifiers 752 and 753 will be required and obtained. The manner of commutation has already been described above, in reference to FIG. 1.

The controlled rectifier 741 (if brush 781 is positive) is all set, and "pretriggered", through a triggering means shown as circuit element 771, which may be a resistor, or an electronic subcircuit, as determined by a designer.

The following remark is now appropriate. The electrical diagrams disclosed are schematic and do not necessarily show all the design details that may be called for in a practical design, that would follow the state of the art. Not shown, but implied, are, for instance, snubber circuits, elements of gate circuits for controlled rectifiers, etc.

At the moment of contact of brush 781 with segment 761, rectifier 741 will immediately start conducting the power current, having been preset through element 771 (when brush 781 is positive). However, this is only a somewhat beneficial side effect of a shift of the triggering connections, with 771 connecting the gate of controlled rectifier 741 to segment 762, i.e. a step ahead. The shift is primarily employed in the design of FIG. 7 to prevent triggering of the oppositely oriented rectifier during the commutation process; observe how in the instances of commutation, when 742 assumes the power current and 743 sheds it, the controlled rectifier 753 is oriented along with the direction of the counter-e.m.f. performing the commutation; therefore, its triggering means 793 must be out of contact with the brush 781.

The design of FIG. 7 is an embodiment of the invention particularly suitable for retrofitting of existing motors. If they are not fitted with interpoles, they are not to be overdriven, or else they are to be supplied from a power source allowing unique sense of current flow only (with diodes); these limitations illustrate the need to prevent the flow of current when the motor acts as a generator while being overdriven. Provided that the machine of FIG. 7 were fitted with interpoles, such limitations are of no concern. A machine with auxiliary commutation field supported by interpoles, when employing the embodiment of the invention illustrated by FIG. 7, effectively becomes an AC-fed DC motor, which, while eliminating sparking, retains the ability to regenerate, i.e. pump power back into AC line while overdriven. Note that, due to the shift in triggering connections, there is a sole direction of rotation.

FIG. 7 shows SCR's used as controlled rectifiers 741, 742,743, . . . 751,752,753, . . . etc. Their function could be just as well performed by triacs, of course.

In the embodiments of the invention that employ a commutator, or a commutator pair, with the commutators being built from isolated segments, the diagrams show the segments and rectifiers as distinct elements. From the electrical point of view, their functions being different, it is only natural. However, they do not have to be constructed separately from the mechanical point of view. With semiconductor rectifiers, it is quite feasible to combine the function of a segment with that of a rectifier, and have them built as mechanical entities specifically adapted to be installed to accomplish both services at the same time, as commutator segments and as rectifiers. While the mechanical shape of semiconductor rectifiers commercially available at the present time may or may not lend itself, more or less easily, to such adaptation, special developments may become justified.

Use of controlled rectifiers allows further great possibilities, making available many designs of machines with new and commercially attractive features.

A major interesting consequence of the use of controlled rectifiers is that it can make the commutators themselves unnecessary. Thus, the "commutator machines" will become commutatorless, while their electrical properties remain unaffected by this design change.

Commutators can be eliminated due to the fact that controlled rectifiers remove the need for the isolation of segments of a commutator, since they themselves can assume this function automatically above a certain speed, corresponding to a value of counter-e.m.f. needed to perform the commutations. Incidentally, it may become advantageous to reverse the mutual position of an armature and a field, making the field rotate and keeping the armature stationary. This may be particularly advantageous if the field can be provided by a permanent magnet, or some transformer means. In such designs, even slip rings are eliminated.

Returning to FIG. 1. which we used to illustrate the case of diode-equipped DC motors, let us now designate 141,142,143, . . . etc. to be controlled rectifiers. Now, assuming that the controlled rectifier 143 was triggered "on" at the moment when controlled rectifier 145 was conducting, controlled rectifier 143 will take on current while 145 will shed it, until it is closed, under the influence of counter-e.m.f., just as described above in the explanation of action of FIG. 1 for diodes; thus, commutation will occur. If we now join segments 161,163, 165, . . . etc. into a ring, no changes whatsoever will occur in the operation. Similar reasoning applies to a ring formed from segments 162,164,166, . . . etc.

Means to trigger controlled rectifiers are many. Shown below, by way of example, will be some that seem particularly adapted to illustrate the application of the invention, in the sense that the type of technology employed to provide the triggering signals is similar to that previously utilized at regular power levels. Obviously, any and all electromechanical means shown below can be replaced by some electronic, opto-electronic and electromagnetic means, since only low-power signals are being handled (e.g., Hall-effect devices in circuits replacing brushes).

FIG. 8 represents, by way of example, a motor with stationary armature and rotating field. All the elements shown on the drawing, with the exception of elements 881 and 882, are a part of armature and therefore stationary. Elements 881 and 882 may be brushes; (but then, again, they may be any other means which perform giving similar results, their common property of interest to us being their ability to first make and then brake a contact, or, equivalently, provide a control pulse of appropriate duration, similar to that accomplished by the mechanical brush shown). Arrows A and B indicate the direction of relative motion of armature and brushes. Brushes rotate synchronously with the field. Brush 881 is shown making a momentary contact closure between a contact 863 (typical) and slip ring 83, which is connected to a signal source. When a contact is made, a controlled rectifier is triggered, and there follows a commutation process already described earlier, in reference to FIG. 1; which is to say, a newly triggered controlled rectifier assumes conduction and the action of counter-e.m.f. extinguishes previously triggered rectifier or rectifiers.

Power source is connected to terminals 81 and 82; the representation of 81 and 82 on FIG. 8 is suggestive of slip rings, which they need not be when armature is stationary. Terminal 82 is being services by its own signal slip ring 84, rotating brush 882, and another auxiliary commutator. The auxiliary commutators, as shown, provide short, signal level, triggering pulses to the triacs, one at the time; for this reason their geometrical proportions are differing from those that are usual in power commutators; this is to prevent a reverse firing of a triac that is being extinguished by counter-e.m.f.

Again, the triggering action shown performed by brushes 881,882, with contacts that close paths from signal sources connected to slip rings 83,84 to the triggering terminals of the triacs, may be accomplished by a variety of other means. A common requirement of all designs following this embodiment of the invention is that controlled rectifiers must be triggered synchronously with the rotating field.

As to the "angle" of the triggering, i.e. selecting the rectifier being fired—or, to put it in other words, as to the brush position—it ought to be arranged so that the commutation occurs by the action of counter-e.m.f. This requires the retardation of the firing "angle", i.e. action equivalent to the retardation of brush position in the art of DC motors. Again, the auxiliary field provided by interpoles can be useful. In general, the requirements for a good commutation process employing rectifying devices according to the present invention are similar to those known to the practitioners of the art under the name of "voltage commutation".

The starting of the motor of FIG. 8 when it is working from a DC power supply represents a problem that can be resolved in many different ways. While all of these may be considered, for the purposes of this disclosure, to be merely "starting means", a solution is given to illustrate the practicality of the overall approach. One preferred embodiment of such starting means is a time-pulse method. To start, power at the terminals 81,82 would be first applied in pulses; or, to put it in another way, the power ought to be first applied with interruptions. This would give a chance to controlled rectifiers, which can not yet be extinguished by the counter-e.m.f., to get extinguished during the power interrupts, and avoid a low speed short-circuit. Note that there is no similar problem when the motor of FIG. 8 is supplied by AC power.

FIG. 9 represents an embodiment of the invention which carries the application of the commutation process of the invention even to the level of triggering signals. The commutation of the triggering gates occurs here analogously to that of the power rectifiers, since the gates of SCR's act as diodes.

In FIG. 9, the relative motion of armature, and brush 981, is assigned to arrows A and B. The power passes through current collecting elements 91 (positive) and 92 (negative), which may be slip rings, or terminals, depending on whether the armature rotates or not; and through SCR's 941,943,945, . . . etc., 942,944,946, . . . etc. Elements 971,973,975, . . . etc., 972,974,976, . . . etc., which may be resistors or other components required by circuit design, make connections of the respective triggering gates to the corresponding segments of signal level commutators formed, first from segments 961,963,965, . . . etc., second from segments 962,964,966, . . . etc. The geometrical proportions of these segments and brushes are similar to those employed in the art of power commutators, to permit successive short-circuiting of counter-e.m.f. $V_{931}$ not only in the power circuit with SCR's 941,943 and current collecting element 91, but also in signal circuit with triggering gates, elements 971,973, segments 961,963 and brush 981.

The motor of FIG. 9 is a DC motor; it needs a starting means, which may be as described above for FIG. 8. In addition, during starting, a signal should be applied to brushes (positive for 981). Above a speed when the counter-e.m.f. becomes effective, no signal may be needed; the signal circuit formed from the triggering gates and brush 981 works in a manner already described in reference to FIG. 1.

The present invention allows to vary widely the selection of a controlled rectifier to be triggered, or the position of brushes. It is possible and practical due to the elimination of sparking. Moving the triggering angle away from the magnetic neutral in the direction of retardation gives a means of speed control in a motor. Moving the triggering angle away from the magnetic neutral in the direction of advance gives a means of voltage control in a generator. (The term "angle" as employed here refers to a spacial position of brushes or controlled rectifiers in a machine, not to be confused with firing angle of the phase of AC wave in the controlled rectifier art).

The process of the invention can be utilized in a great variety of designs. The descriptions above were referring to motors and generators; but it is just as applicable, say, in converters, i.e. machines for the transformation of electrical energy. By way of example consider a machine as in FIG. 9, where the field and the brushes (one brush 981 is shown) rotate synchronously with each other; and in addition to the armature shown, there is another one beside it, envelopping the same magnetic space. With the armature shown serving as a primary, the second one can serve as a secondary, in what is effectively DC to AC transformer, (or DC to DC transformer, if the secondary is equipped with diodes in the same manner as the primary is equipped with SCR's). With the armature being stationary, the speed of rotation of the field adapts itself to correspond to the voltage which is supplied to the terminals 91,91; the quantity of secondary terminals depend on the choice of the number of phases. A design in accordance with the state of the art techniques would allow to fit the speed of field rotation, and, consequently, AC frequency, as well as its voltage, within the limits desired.

Also, it will be obvious to a designer to extend the techniques of the invention as disclosed in reference to FIG. 3, FIG. 5, and FIG. 6, to assure the presence of regeneration properties in machines designed in accordance with FIG. 7, FIG. 8, and FIG. 9 if they are not intrinsically available.

I claim:

1. A dynamo-electric machine comprising:
   an armature having a plurality of coils, the interconnections of said coils forming first and second sets of nodes,
   a first set of electrically isolated commutator segments,
   a second set of electrically isolated commutator segments,
   a first group of rectifying devices,
   a second group of rectifying devices,
   said first group of rectifying devices being connected to said first set of commutator segments and said first set of nodes,
   said second group of rectifying devices being connected to said second set of commutator segments and and said second set of nodes,
   at least one brush bearing on each of said sets of commutator segments, the span of said brush being such that the brush bears on adjacent segments simultaneously.

2. A dynamo-electric machine as in claim 1, wherein said second group of rectifying devices is being connected to said second set of commutator segments and said first set of nodes.

3. In a dynamo-electric machine comprising:
a plurality of coils, forming an armature,
means for producing a magnetic field, having polarities,
commutator means with electrically isolated segments and brushes,
said armature and said magnetic field being capable of relative motion,
said motion producing e.m.f. in said coils,
commutation being performed during said relative motion as said brushes come in contact and then lose contact with said commutator segments, short-circuiting successfully said coils,
an improvement which comprises:
rectifying devices connected between said coils and said commutator segments,
said brushes being so positioned on said commutators that said brushes cause said successive short-circuiting while said coils are in the magnetic field of appropriate polarity, so that the e.m.f. of said relative motion in said short-circuited coils acts to assist in assuming said current by the segment and its rectifying device that just came into contact with said brushes and in shedding said current in the segment and its rectifying device that are going to lose contact with said brushes, wherein said current in the segment and its rectifying device that are going to lose contact with said brushes is reduced to zero before the brushes lose contact, and, with said rectifying device preventing a reversal of current, said current in the segment and its rectifying device that are going, and are about to lose contact with said brush approximates zero when said brushes actually lose contact with said commutator segment.

4. In a dynamo-electric machine comprising:
coils, having nodes,
a pair of commutators with electrically isolated segments,
an improvement which comprises:
diode rectifiers connected between said nodes of the coils and said isolated segments of the commutators, said diode rectifiers having anodes and cathodes,
said diode rectifiers connected so as to assure a consistency of choice of orientation of said anodes and cathodes, with one commutator accepting its rectifiers by the anodes only, the other commutator accepting its rectifiers by the cathodes only,
thereby defining a polarity of one commutator as positive when said dynamo-electric machine is motoring, defining said polarity of this very same commutator as negative when said dynamo-electric machine is generating, and inversely defining the other commutator as negative for motoring, positive for generating.

5. In a dynamo-electric machine according to claim 4, further comprising:
armature, formed from said coils,
means for producing a magnetic field, said field having a neutral,
brushes, in pairs,
said armature and said magnetic field being capable of relative motion,
said brushes being capable of assuming a retarded, as well as advanced, position in reference to the rotation and the magnetic neutral,
wherein the improvement further comprises:
positioning means chosen to assure retarded position for said brush pairs wherein said dynamo-electric machine is motoring, and to assure advanced position for said brush pairs wherein said machine is generating.

6. In a dynamo-electric machine according to claim 5, said machine being a DC electric motor which is further characterized by
generating action while being overdriven,
capability of rotation reversal,
wherein said magnetic field has a chosen orientation, not to be reversed after the brushes have been positioned as described,
wherein the improvement further comprises:
means for insuring simultaneous presence of both retarded and advanced brush pairs, cooperating to retain said characteristics of generating action and said capability of rotation reversal, wherein, upon such rotation reversal, brushes that served motoring go to serve generating, and vice versa, brushes that served generating go to serve motoring.

7. In a dynamo-electric machine according to claim 4, further comprising:
means for producing a main magnetic field, said field having a geometric neutral,
brushes, in pairs,
means for producing an auxiliary commutation assistance field, known also as interpole field, with interpoles in pairs,
wherein the improvement further comprises:
means for positioning said brushes at said geometric neutral, wherein said commutation has the assistance of said interpole field.

8. In a dynamo-electric machine according to claim 7, said electrical machine being an electric motor which is further characterized by
generating action while being overdriven,
capability of rotation reversal,
capability to utilize AC power, as well as DC power,
wherein the improvement further comprises:
means for insuring simultaneous presence of at least two pairs of brushes at said pair of commutators, one brush for each intersection of said geometric neutral of said main magnetic field with each of said commutators; said brushes, in cooperation with said positive and negative commutators, being available to provide all polarities required for all combinations of motoring and generating, in reference to said polarities, for their interconnection; thereby permitting to retain said characteristics of generating action, rotation reversal, and AC power utilization.

9. In an electric motor comprising:
coils, having nodes and producing rotational e.m.f.,
one commutator, with electrically isolated segments,
a pair of brushes,
an improvement which comprises:
controlled rectifiers placed between said nodes and said electrically isolated segments, said controlled rectifiers being chosen from a class that comprises thyristors and triacs, and wherein said thyristors are arranged in back to back pairs, with mutually opposite orientation of said thyristors in said pairs, so as to be equivalent to triacs, triggering means connected so that they render successively each said controlled rectifier conductive (one of a pair, for thyristors), when said brush comes in contact with said segment, said rotational e.m.f. being allowed to extinguish said controlled rectifier before said brush loses contact with said segment.

10. In an electric motor according to claim 9, having a singular direction of rotation, said motor further characterized by its ability to accept AC power, as well as DC power, and further comprising magnetic field in phase with said AC power, said magnetic field having a neutral, an improvement which further comprises:

means for chosing a retarded position of said brushes, in reference to said direction of rotation and said magnetic field neutral, means for insuring cooperation of said triggering means with their controlled rectifiers, by connecting the triggering means of each controlled rectifier to a said electrically isolated segment of said commutator that is located in advance in reference to said direction of rotation, whereby creating a shift that serves to disconnect said triggering means before said rectifier, which was rendered conductive during said commutation process, is extinguished, said in phase magnetic field being used for allowing passage of said AC power, as well said DC power.

11. In an electric motor according to claim 9, further comprising:

means for producing a main magnetic field, means for producing an auxiliary commutation assistance field, with interpoles in pairs, and further characterized by capability of generation when overdriven, an improvement which further comprises:

means for positioning said brushes under said interpoles, thereby rendering said electric motor capable of using said AC power, as well as said DC power, thereby conserving said characteristics of generation when overdriven.

12. In a dynamo-electric machine as in claim 4, or 9, an improvement as described, wherein said rectifiers are semiconductor rectifiers, said semiconductor rectifiers are shaped to form said electrically isolated segments of said commutators.

13. In a dynamo-electric machine comprising:

means for producing a magnetic field, a plurality of coils, forming an armature, current collection means, said armature and said field being capable of relative motion, e.m.f. being induced in said coils as consequence of said relative motion of said armature and said field;

an improvement which comprises:

a plurality of controlled rectifying devices, each device having two power terminals an a triggering terminal, wherein, said controlled rectifying devices, while being individually connected each, with one of its power terminal, to a respective coil from said plurality of coils forming an armature, are grouped, with their opposite power terminals, to a pair of electrically common points that form part of said current collection means, means for triggering, consecutively and successively, each controlled rectifying device in synchronism with said relative motion, said e.m.f. of relative motion being allowed to extinguish each said controlled rectifying device, consecutively and successively, in synchronism with said relative motion of said armature and said field.

14. In a dynamo-electric machine according to claim 13, said machine a universal motor, an improvement as described, wherein said controlled rectifying devices are triacs, having two power terminals and a trigger terminal, said triggering means are a pair of auxiliary commutators with electrically isolated segments, and auxiliary brushes, in pairs, said auxiliary commutators and brushes designed to handle low power triggering signals, said improvement further comprising:

means for connecting said trigger terminals of said triacs each individually to one said electrically isolated segment of said auxiliary commutator, at least one auxiliary brush bearing on each of said auxiliary commutators, the spans of said auxiliary brush and of said segments being such that the brush does not bear on adjacent segments simultaneously, thereby providing for triggering of one said triac after another consecutively and successively, energizing said triggering signals in said synchronism with said relative motion of said armature and said field.

15. In a dynamo-electric machine according to claim 13, said electrical machine is a DC motor, which further comprises starting means, an improvement as described, wherein said controlled rectifying devices are thyristors, having two power terminals and a triggering terminal, said triggering means are a pair of auxiliary commutators with electrically isolated segments, and auxiliary brushes, in pairs, said auxiliary commutators and brushes designed to handle low power triggering signals, said improvement further comprising:

means for connecting said triggering terminals of said thyristors each individually to one of said electrically isolated segments of said auxiliary commutators, at least one auxiliary brush bearing on each of said auxiliary commutators, the span of said brush being such that the brush bears on adjacent segments simultaneously, to sustain, consecutively and successively, a closed circuit including a pair of said triggering terminals, said e.m.f. of said relative motion being allowed to perform, in said closed circuit, triggering and extinguishing of said triggering terminals, said starting means being used in absence of said relative motion.

16. In a dynamo-electric machine according to claim 5, 14, or 15, said machine having a variable speed, when used as a motor, and variable voltage, when used as a generator, wherein said brushes, or said auxiliary brushes, can be shifted in reference to said relative rotation or motion of said armature and said field, an improvement for varying said speed in a motor, comprising:

means for retarding said brushes, and an improvement for varying said voltage in a generator, comprising:

means for advancing said brushes, thereby varying said speed, or said voltage.

17. In a dynamo-electric machine according to claim 13, said machine is a converter, in particular a DC to AC converter, which further comprises, an additional armature, said first armature serving as a primary, and said additional armature serving as a secondary of said DC to AC converter.

* * * * *